(12) United States Patent  
Hickerson

(10) Patent No.: US 7,864,439 B1  
(45) Date of Patent: Jan. 4, 2011

(54) LINEAR ELECTROWETTING-BASED ACTUATOR

(75) Inventor: Kevin Hickerson, Altadena, CA (US)

(73) Assignee: Energy Innovations, Inc., Poway, CA (US)

( * ) Notice: Subject to any disclaimer, the term of this patent is extended or adjusted under 35 U.S.C. 154(b) by 565 days.

(21) Appl. No.: 11/502,295

(22) Filed: Aug. 10, 2006

Related U.S. Application Data

(60) Provisional application No. 60/707,588, filed on Aug. 11, 2005.

(51) Int. Cl.
*G02B 1/06* (2006.01)

(52) U.S. Cl. .................................................. 359/666

(58) Field of Classification Search .......... 359/665–667
See application file for complete search history.

(56) References Cited

U.S. PATENT DOCUMENTS 4,963,471 A * 10/1990 Trout et al. .............. 430/282.1

6,844,953 B2 * 1/2005 Reboa ........................ 359/224
2005/0113912 A1 * 5/2005 Feenstra et al. ............ 623/6.13
2007/0139751 A1 * 6/2007 Kuiper et al. .............. 359/223

FOREIGN PATENT DOCUMENTS

WO    WO 2004051323 A1 *  6/2004

* cited by examiner

*Primary Examiner*—Joseph Martinez
*Assistant Examiner*—James R Greece
(74) *Attorney, Agent, or Firm*—Andrew Naglestad

(57) ABSTRACT

Disclosed is an electrowetting-based apparatus comprising, in some embodiments, a plurality of immiscible fluids. The boundary between the fluids is made substantially planar with the application of select voltages to electrodes distributed around the cell containing the fluids. The electrodes are also adapted to alter the orientation of the substantially-planar fluid boundary, thereby allowing the fluid boundary to be steered in a determined direction. Light impinging on the boundary may therefore be refracted and redirected in a determined direction. Similarly, a reflective surface may be held in suspension at the fluid boundary, thereby providing a mirror with which to redirect impinging light. The electrowetting cell disclosed herein may be used as an optical switch, actuator, lens, concentrator, or like device.

13 Claims, 10 Drawing Sheets

LINEAR ELECTROWETTING-BASED ACTUATOR

CROSS-REFERENCE TO RELATED APPLICATION

This application claims the benefit of U.S. Provisional Patent Application Ser. No. 60/707,588 filed Aug. 11, 2005, entitled "LINEAR ELECTROWETTING-BASED ACTUATOR," which is hereby incorporated by reference herein for all purposes.

TECHNICAL FIELD

The invention relates to a system for controlling the orientation of a fluid boundary based on the surface tension of one or more of the fluids. In particular, the invention in some embodiments pertains to a system for varying the orientation of a fluid boundary to form an actuator, or for redirecting light in an optical switch or light-focusing apparatus.

BACKGROUND

The principle of electrowetting has been known as far back as 1875. Modernly, the concept is being developed to produce a variable-focus lens from a single water droplet for mobile phones. While such an application can be achieved with modest variations in the shape of the droplet, this contemporary application of electrowetting fails to provide a solution for optical switches, for example, where relatively large planar surfaces are useful for redirecting beams of light. There is therefore a need for a system adapted to induce relatively large changes in the orientation and position of an electrowetting solution, which may then be used to reflect and/or refract light signals.

SUMMARY

The invention in the preferred embodiment overcomes the problems with the prior art with a cell or actuator that employs electrowetting to induce large displacements in one or more captive fluids or droplets. The electrowetting cell in one preferred embodiment comprises: a suspension medium comprising a plurality of immiscible fluids, the fluids comprising an electrolyte and a second fluid; a surface suspended between the electrolyte and the second fluid; and at least one electrode capacitively coupled to the suspension medium; wherein application of a determined voltage to one or more of the at least one electrode displaces the electrolyte to induce a displacement of the surface. The second fluid generally comprises an electrical insulator such as an alkane. The surface, which floats between the electrolyte and a second fluid, is preferably a substantially planar layer or sheet of material. The opposing sides of the planar layer may be hydroscopic and hydrophobic to enhance the ability of layer to float at the boundary between the two fluids. At least one of the two opposing sides of the surface may be reflective in order to redirect incident light in a predetermined direction. The orientation of the surface, and therefore the redirected light, is dependent on the voltage applied to the at least one electrode embedded in walls of the cell in order to perturb the surface tension of the electrolyte. Thus, the reflective (or refractive) surface is actuated for the purpose of directing the light to a receiver in a solar concentrator, optical switch, or like device.

In one embodiment, the electrowetting cell is an optical element comprising: a cell having a first window, a second window, and a plurality of walls. The plurality of walls includes a first wall and a second wall opposite the first wall. The windows and walls either partially or fully contain a plurality of immiscible fluids comprising an electrolyte and a second fluid explained in more detail below. One or more electrodes embedded in or in proximity to the walls are adapted to capacitively couple to at least one of the immiscible fluids. When the voltage of the electrodes is changed by a voltage controller, contact angles between the immiscible fluids and walls are changed. When the first and second walls are parallel and the size of the cell is small, for example, the boundary between the immiscible fluids is substantially linear (in cross section) and the sum of the first contact angle and the second contact angle is substantially equal to 180 degrees. Light transmitted through the first window may be redirected through the second window at a determined angle based on the applied voltages.

In another embodiment, the electrowetting cell is an actuator including at least one portion of electrolytic fluid; a layer or surface adherent to the at least one portion of electrolytic fluid; at least one electrode adapted to capacitively couple to the electrolytic fluid; and a voltage controller adapted to apply a voltage to one or more of the at least one electrode to displace the electrolyte. Application of a voltage to one or more electrodes alters the contact angle associated with one or more of the fluids, which changes the shape of one or more portions of fluids, which in turn dictates the orientation of the surface. One or more sides of the surface may be reflective in order to reflect incident light in a predetermined manner in an optical switch, for example.

DETAILED DESCRIPTION OF THE PREFERRED EMBODIMENT

Figure 1:
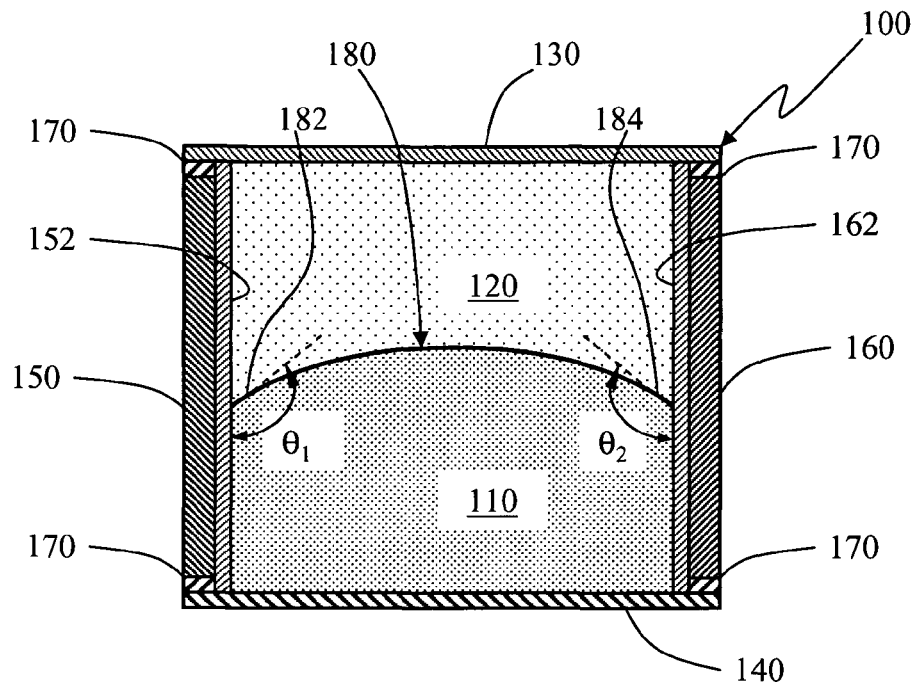
FIG. 1 is a cross-sectional view of an electrowetting cell in the absence of an external voltage, in accordance with one embodiment of the present invention.

Illustrated in FIG. 1 is a cross-sectional view of a fluid reservoir or cell used in the preferred embodiment of the present invention to form an actuator or an optical switching element. The cell 100 utilizes a voltage applied via one or more electrodes to perturb the surface tension of one or more fluids in the cell, thus causing a displacement of the fluid.

The displacement of the fluid, in turn, may induce translational or rotational displacement of an actuator surface or induce a change in the direction of impinging light, for example. The application of voltage to alter the surface tension and thereby reshape a contact angle characterizing a fluid boundary is generally referred to as electrowetting.

The cell 100 includes a cavity or a reservoir containing one or more fluids including a first fluid 110, preferably an electrolyte. The cell 100 may further include a second fluid 120, preferably a non-conductive fluid such as an alkane. In some embodiments, the first fluid 110 and second fluid 120 are immiscible fluids such as a hydrosolic saline solution and mineral oil. The cell 100 may further include one or more electrodes including, for example, a first wall having a first electrode 150 and a dielectric 152, and an opposing second wall having a second electrode 160 and dielectric 162. The first wall and second wall are insulated from the top 130 and bottom 140 by means of electrical insulators 170.

Assuming the immiscible fluids 110, 120 have different density, the fluids tend to separate under the force of gravity and form a fluid boundary 180. Where the cohesive forces between the molecules of the first fluid 110 and the second fluid 120 are not balanced with the adhesive forces between the liquids and the walls, the boundary 180 forms a meniscus. The meniscus is characterized by a first contact angle, $\theta_1$, between the first fluid 110 and first wall, and by a second contact angle, $\theta_2$, between the first fluid 120 and the second wall. In the absence of any applied potential, the first contact angle and the second contact angle are generally equal.

Figure 2:
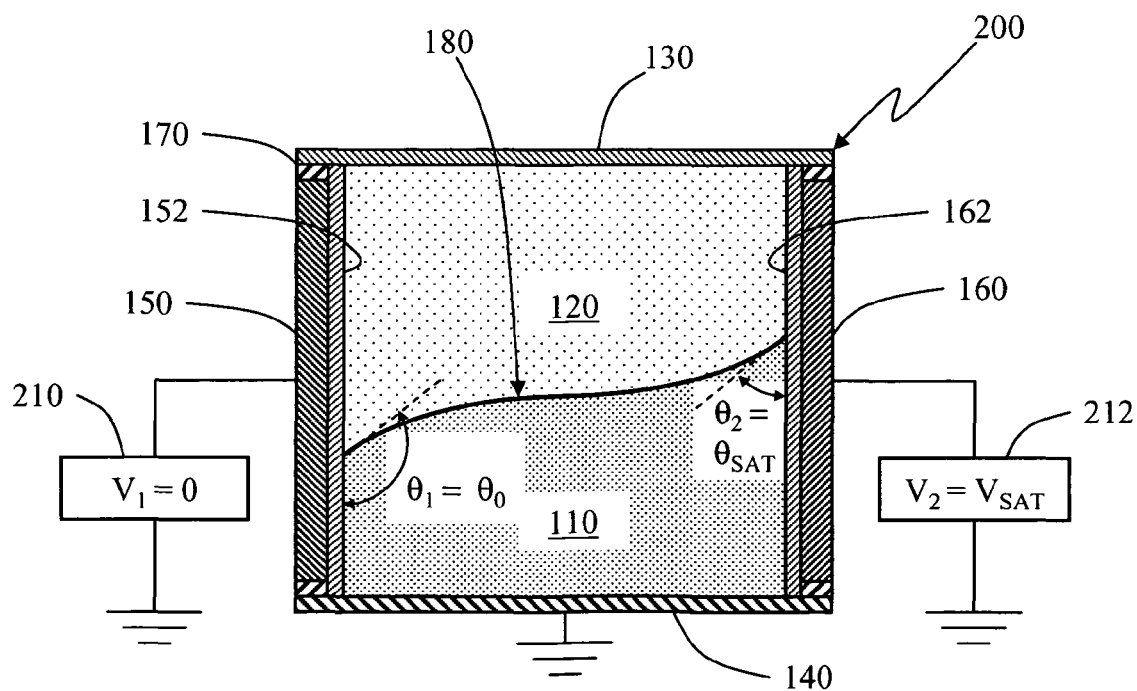
FIG. 2 is a cross-sectional view of an electrowetting cell in the presence of an external voltage, in accordance with one embodiment of the present invention.

Illustrated in FIG. 2 is a cross-sectional view of an electrowetting cell 200 including the cell 100 as well one or more voltage controllers for changing the surface tension of the fluids 110, 120, thereby changing the shape of the boundary 180, the orientation of the boundary, or both. The first contact angle, for example, may be increased when a potential different is induced between the first electrode 150 and the electrolyte to create a capacitive link there between. When a voltage, $V_1$, is applied to the first electrode 150 and the dielectric 152 with a first voltage regulator 210, for example, charge induced in the electrolyte 110 changes the surface tension of the electrolyte 110, thereby changing the associated contact angle. In general, the contact angle may be increased up to a limit associated with a saturation voltage, $V_{SAT}$. A second voltage regulator 212 may also be employed to independently control the associated second contact angle. In general, the contact angle may be varied by 40 or 50 degrees depending on the constituents of the cell 100, and the fluids, and the applied voltage.

As known to those skilled in the art, the magnitude of the contact angles are given by the electrowetting equation commonly referred to as the Lippmann-Young's equation:

$$\cos(\theta_v) - \cos(\theta_0) = \frac{1}{2}\frac{\varepsilon\varepsilon_0}{\gamma d}V^2 \qquad [1]$$

where V is the applied voltage, d is the dielectric thickness, $\gamma$ is the surface energy of the electrolytic fluid at the boundary with the dielectric, $\theta_0$ is the contact angle of the boundary if no voltage is applied, $\in$ the electrical permittivity of the dielectric, and $\in_0$ is the electrical permittivity of free space. The surface energy is indirectly related to the surface energy of the electrolytic fluid and the second fluid.

Figure 3:
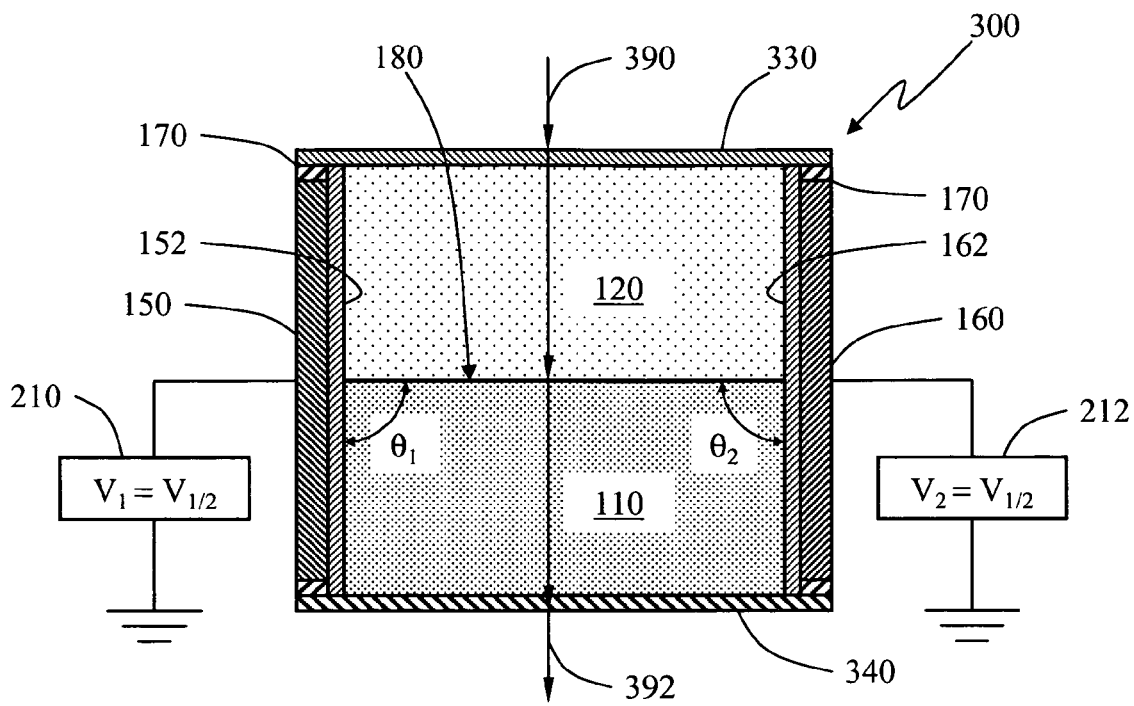
FIG. 3 is a cross-sectional view of an electrowetting cell adapted to perform optical switching, in accordance with one embodiment of the present invention.

Illustrated in FIG. 3 is a cross-sectional view of the first preferred embodiment of the electrowetting cell 300 adapted to perform optical switching. The cell 300 serves as a reservoir to contain fluid using a top side, bottom side and a plurality of side walls. The top side 330 is a window or port adapted to receive radiation, preferably light 390, from an optical source (not shown). Similarly, the bottom side 340 is a window or port adapted to transmit the light 392 originating from the optical source to an optical output (not shown). The plurality of side walls includes a first wall and second wall having a first conductor 150 and second conductor 160 operatively coupled to the first voltage controller 210 and second voltage controller 212, respectively. The first and second walls are lined with a dielectric having a low dielectric constant, preferably TEFLON AF (available from DUPONT) which has one of the lowest if not the lowest known dielectric constant of any plastic material. As illustrated, at a determined voltage of the voltage controllers 210, 212, the contact angle between the electrolyte 110 and both the first and second walls is $\pi/2$ and the meniscus substantially suppressed. The resulting fluid boundary 180 is substantially planar and parallel to the input window 330 and output window 340. Thus, the light 392 transmitted from the second window 340 is substantially parallel to the incident light 390 impinging normal to the first window 330. The select voltages produced by the first regulator 210 and second voltage regulator 212 are at an intermediate voltage less than the saturation voltage (the saturation voltage being the voltage above which no additional change in the contact angle may be achieved). The intermediate voltage that orients the fluid boundary 180 perpendicular to the side walls is given by:

$$V = \sqrt{\frac{-2\gamma d}{\varepsilon\varepsilon_0}\cos(\theta_0)}. \quad [1.1]$$

Figure 4:
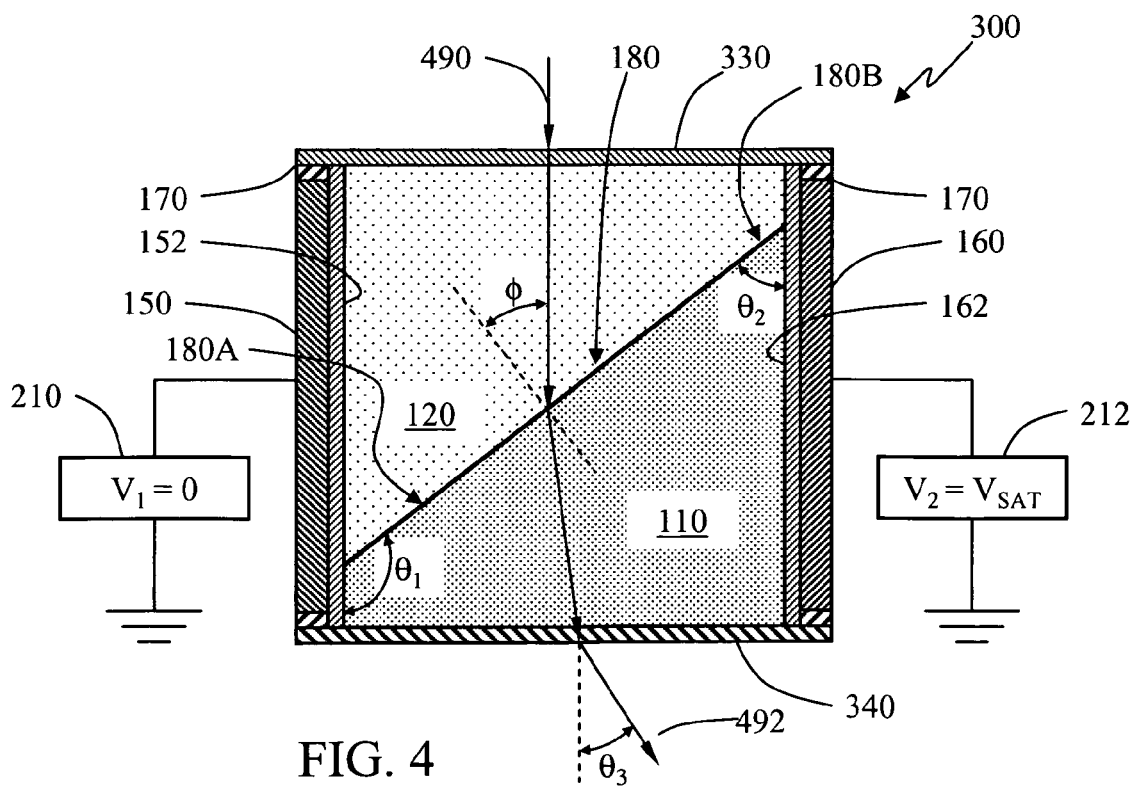
FIG. 4 is a cross-sectional view of an electrowetting cell adapted to perform optical switching, in accordance with one embodiment of the present invention.

Illustrated in FIG. 4 is a cross-sectional view of the first preferred embodiment of the electrowetting cell 300 in which the orientation of the fluid boundary is rotated or canted relative the input window 330 and output window 340. The first voltage, $V_1$, and the second voltage, $V_2$, are selected such that the left peripheral edge 180A and right peripheral edge 180B of the fluid boundary are substantially parallel, that is, the sum of the first contact angle, $\theta_1$, and the second contact angle, $\theta_2$, is equal to $\pi$ where the first and second walls are parallel. When the separation distance of the first and second walls is selected small enough—e.g., less than several millimeters—the gravitational forces are negligible with respect to the cohesive and adhesive forces between the fluids 110, 120 and the dielectric surfaces 152, 162, the intermediate portion of the boundary 180 between the left peripheral edge 180A and right peripheral edge 180B is flush with and parallel to the boundary surface at the left and right peripheral edges. The boundary 180 is, therefore substantially linear in two dimensions and may be made substantially planar in three dimensions. As one skilled in the art will appreciate, the first voltage and second voltage may be varied in cooperation to maintain the linearity of the boundary 180 over various orientations of the boundary ranging between the unbiased contact angle and the saturated contact angle. In general, the saturated contact angle is approximately equal to $\pi$ less the unbiased contact angle. This relationship occurs where the angle of the fluid boundary, i.e., the surface tilt, as measured from the conductors 150 and 160, $\phi$, satisfies the following relationship:

$$\sin(\phi) = \frac{1}{4}\frac{\varepsilon\varepsilon_0}{\gamma d}(V_2^2 - V_1^2) \quad [2]$$

Assuming the first fluid 100 and second fluid have different indexes of refraction, the orientation of the boundary 180 may be canted at a determined angle to refract the input light 490 and transmit output light 492 at a select angle, $\theta_3$, with respect to the input light. When adapted to serve as an optical switching element, the cell 300 may be used to direct output light to one of a plurality of fiber optic cables (not shown) or other signal carriers that operatively link various nodes in a data communications network, for example.

Figure 5:
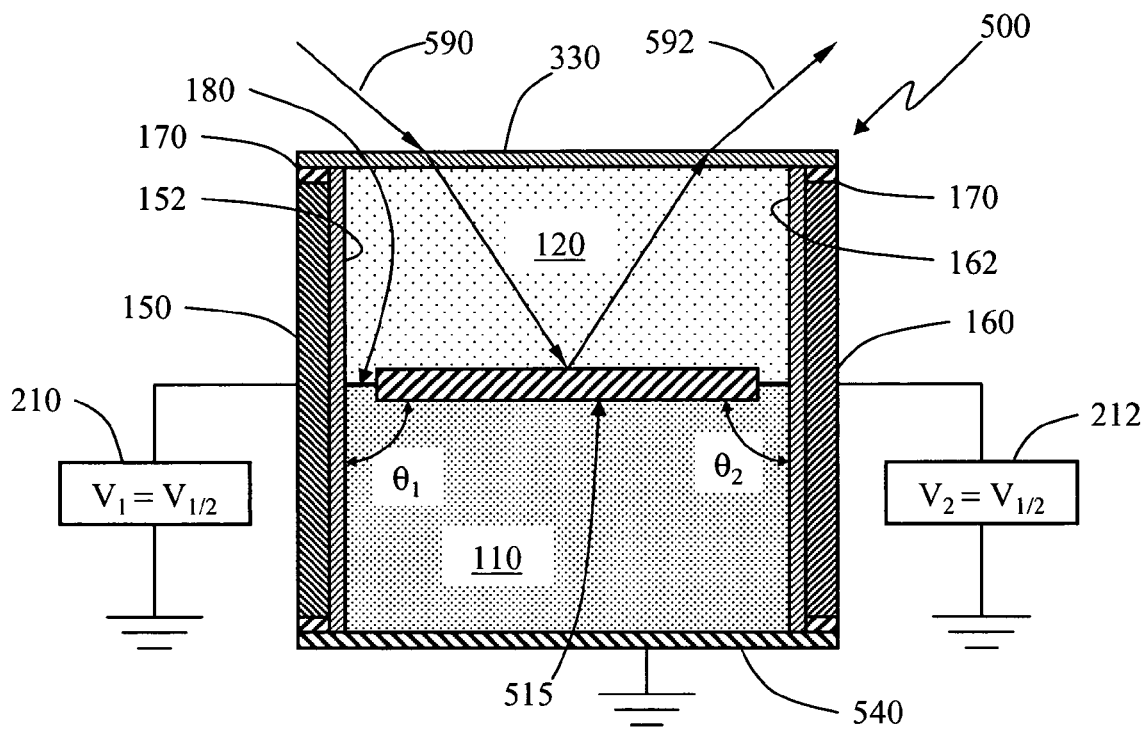
FIG. 5 is a cross-sectional view of an optical switch with a reflective surface or element, in accordance with one embodiment of the present invention.
Figure 6:
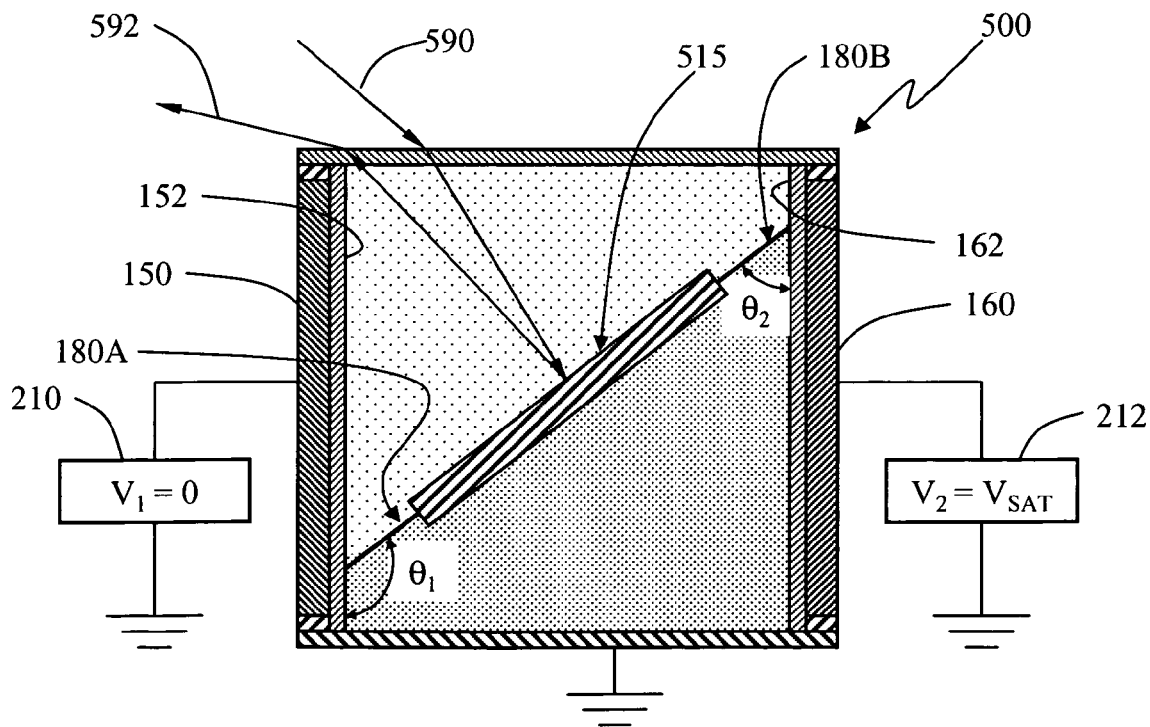
FIG. 6 is a cross-sectional view of an optical switch with a reflective surface or element, in accordance with one embodiment of the present invention.

Illustrated in FIGS. 5 and 6 is a cross-sectional view of the first preferred embodiment of the electrowetting cell 500 adapted to serve as an actuator. The cell preferably includes an actuator surface 515 that may be displaced, preferably rotated, in response to the application of a voltage at one or more electrodes distributed over the perimeter of the cell. The actuator surface 515 in some embodiments is adapted to float between the first fluid 110 and second fluid 120, although one skilled in the art will appreciate that the actuator surface may also be rotatably attached or otherwise linked to a side of the cell or other component. As illustrated in FIG. 5, when the first electrode and second electrode are held at a determined potential difference with respect to the electrolyte, the fluid boundary 180—and therefore the actuator surface 515—is substantially perpendicular to the dielectric surfaces 152, 162. The determined voltage applied to the two electrodes 150, 160 are approximately equal to half the saturation voltage.

The actuator surface may also be canted or otherwise repositioned by the displacement of the electrolyte 110 when one of the two electrodes 150, 160 is held at a voltage different from the opposing electrode such that the sum of the contact angles, $\theta_1$ and $\theta_2$, is equal to $\pi$. Referring to FIG. 6, if the voltage of the first electrode 150 is driven to the saturation voltage, for example, the actuator surface 515 may be rotated counter-clock wise to an orientation characterized by a contact angle approximately equal to $\pi$ less the unbiased contact angle. The actuator then returns to its unbiased orientation once the voltages applied to the one or more electrodes are returned to zero. In some embodiments, the actuator cell 500 includes three or more electrodes positioned about the top and bottom surfaces, for example, to increase the angle of rotate of the actuator surface 515. With electrodes distributed about the circumference of the cell 500, the angle of rotation of the actuator surface 515 may be increased to or exceed 360 degrees, thereby forming a rotary engine.

In some embodiments, the actuator surface 515 includes a substrate having one or more surface treatments to enhance the adhesive or repulsive forces between the actuator surface 515 and one or more of the fluids in the cell. In the preferred embodiment, the substrate includes a hydrophilic layer deposited on or applied to one side and a hydrophobic layer deposited on or applied to the opposing side of the surface 515. The substrate is preferably Mylar SA-85 available from 3M Corporation, the hydrophobic layer is preferably acetate material, and the hydrophilic layer is preferably tetrafluoroethylene (TFE) or polyTFE (PTFE). Using the hydrophilic and hydrophobic layers to enhance the attraction to and repulsion of the electrolyte 110, respectively, the actuator surface 515 strongly resists displacement away from the fluid boundary 180.

In the preferred embodiment, the Mylar substrate is aluminized to serve as a reflector, preferably an optical mirror. When the fluid boundary 180 is substantially parallel to the input window 330, light 590 from an optical input is reflected from the actuator surface 515 at a determined angle from the first window 330. Referring to FIG. 6, the angle at which the reflected output light 592 is transmitted may be varied by altering the voltages—$V_1$, $V_2$, or both—provided by the voltage controllers 210, 212. The resulting electrowetting cell 500 may therefore be used as a switch, preferably an optical switch adapted to selectively redirect an output signal to one of a plurality of optical output ports or fibers (not shown), for example.

Figure 7:
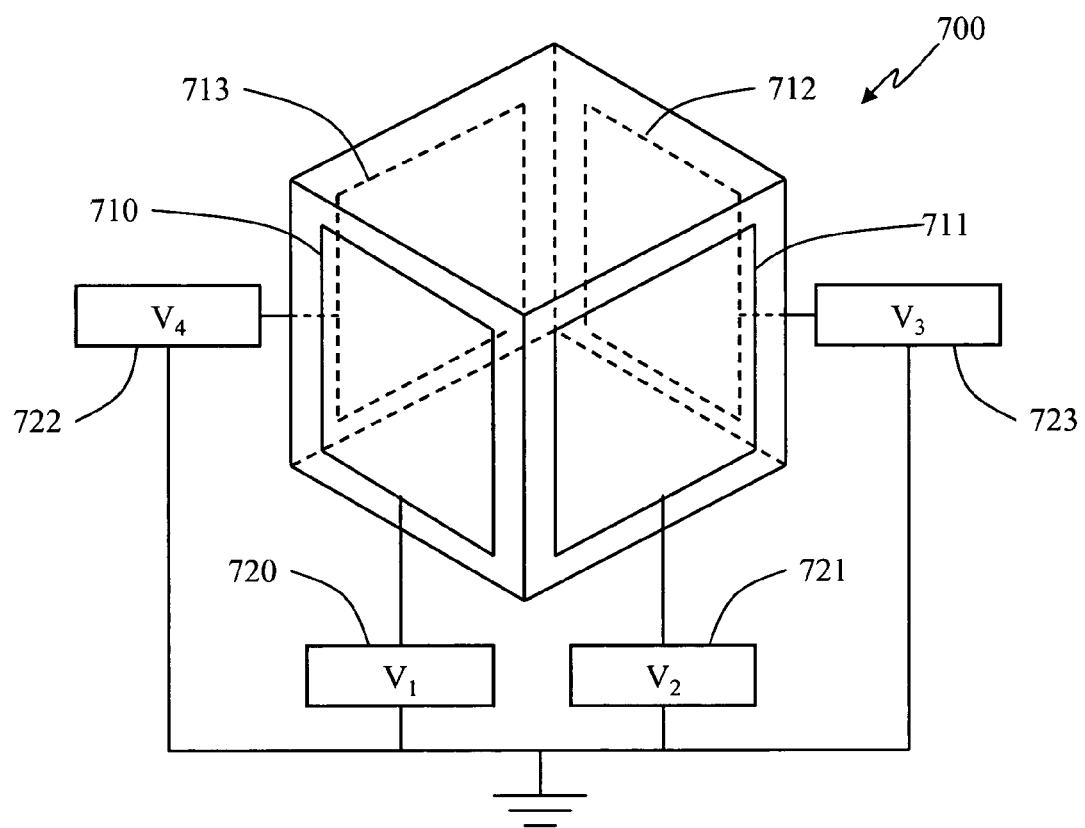
FIG. 7 is an isometric view of an electrowetting cell, in accordance with one embodiment of the present invention.

Illustrated in FIG. 7 is an isometric view of an electrowetting cell 700 in accordance with one embodiment of the invention. The cell 700 possesses the general shape of a cube or rectangular box. A plurality of the walls of the cell 700, potentially all six, include one or more electrodes capacitively coupled to one or more fluids therein. In this exemplary embodiment, each of the four electrodes 710-713 on the four side walls of the cell 700 includes an electrode 720-723, respectively. The voltage of the electrodes 710-713 may be independently controlled so as to orient a fluid boundary or to displace an actuator surface (not shown) about two degrees of freedom, e.g., to cant the actuator surface about two orthogonal axes in a horizontal plane perpendicular to the four electrodes 720-723. As discussed above, one or more of the walls may include transparent windows used to receive and transmit light where the cell is used as an optical switching element, for example.

Figure 8:
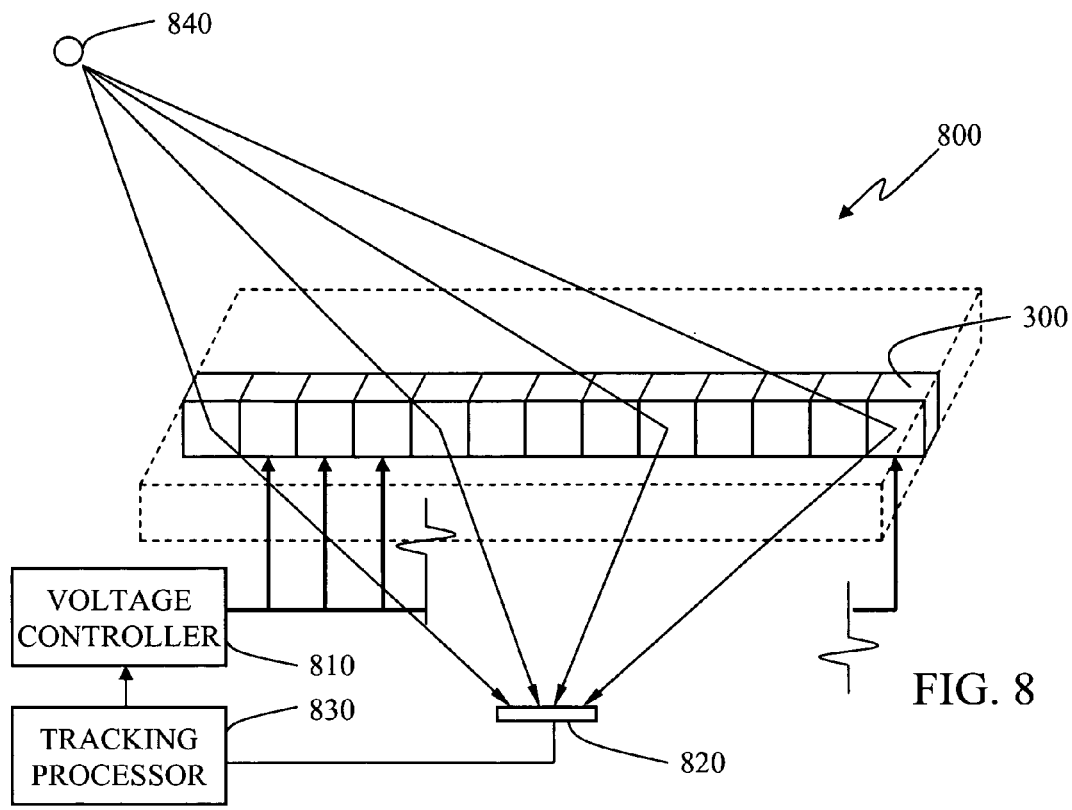
FIG. 8 is an isometric view of an optical switching array with refractive surface or elements, in accordance with one embodiment of the present invention.

Illustrated in FIG. 8 is schematic diagram of an array of electrowetting cells consistent with the electrowetting cell 300 of FIGS. 3-4. The array 800 includes one or more voltage controllers adapted to redirect incoming light from a source based upon its incidence angle. In particular, the voltage controllers—collectively represented by voltage controller 810—are adapted to apply a voltage to one or more electrodes that orient the fluid boundary in each of the plurality of cells 300 to cause the incoming light to be refracted and redirected in the direction of a receiver 820. The receiver 820 may be a charged coupled device (CCD), a photovoltaic cell(s) or a heat engine, for example. One skilled will appreciate that the electrowetting cell array 800 has numerous applications including, for example, focusing devices used in imaging electronics and flux concentrators used in solar collectors. When employed in a solar collector, the array 800 may further include a processor 830 to continually track the sun 840 and update the orientation of the fluid boundaries in order to maximize the received energy.

Figure 9:
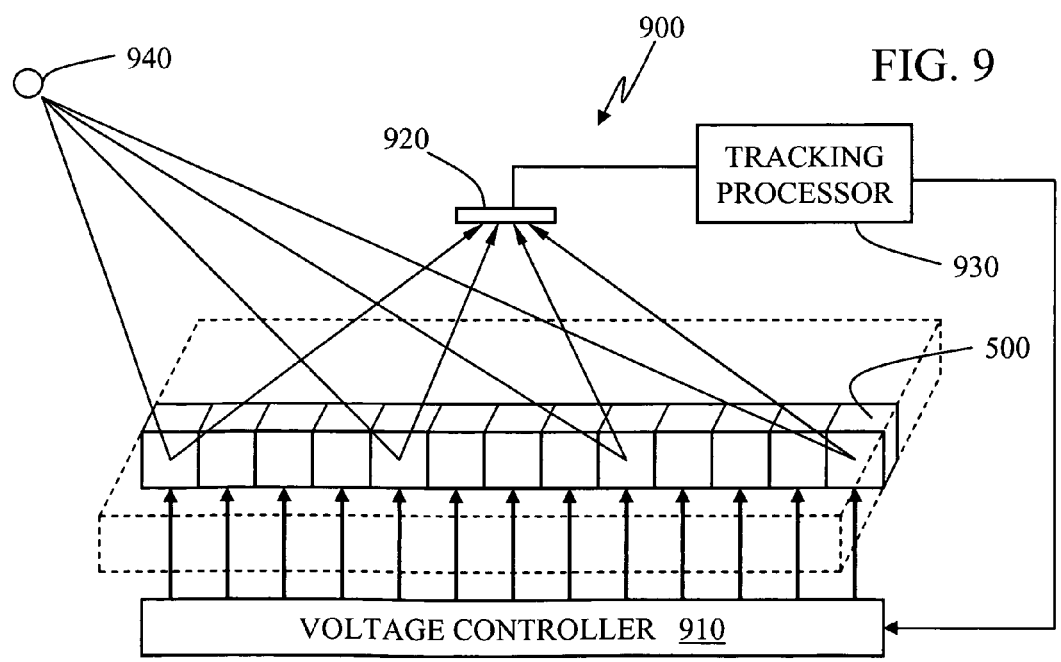
FIG. 9 is an isometric view of an optical switching array with reflective surface or elements, in accordance with one embodiment of the present invention.

Illustrated in FIG. 9 is schematic diagram of an array of electrowetting cells consistent with the electrowetting cell 500 of FIGS. 5-6. The array 900 includes one or more voltage controllers adapted to redirect incoming light from a source based upon its incidence angle. In particular, the voltage controllers—collectively represented by controller 910—are adapted to apply a voltage to one or more electrodes so as to orient the boundary-layer mirrors (not shown) in each of the plurality of cells 500 and reflect the incoming light towards a receiver 920. The receiver 920 may be a CCD, photovoltaic cell or heat engine, for example. One skilled will appreciate that the electrowetting cell array 900 has numerous applications including, for example, focusing devices used in imaging electronics and flux concentrators used in solar collectors. When employed in a solar collector, the array 900 may further include a processor 930 to continually track the sun 940 and update the mirror orientations in order to maximize the received energy.

Figure 10:
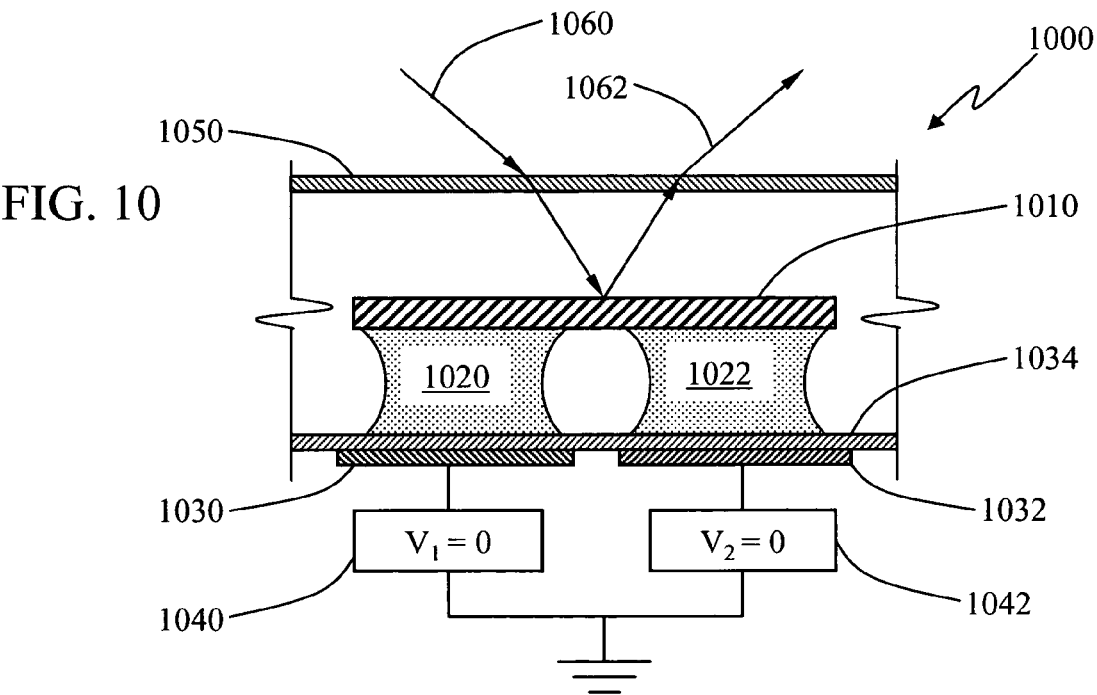
FIG. 10 is a cross-sectional view of an optical switch with a reflective element, in accordance with another embodiment of the present invention.
Figure 11:
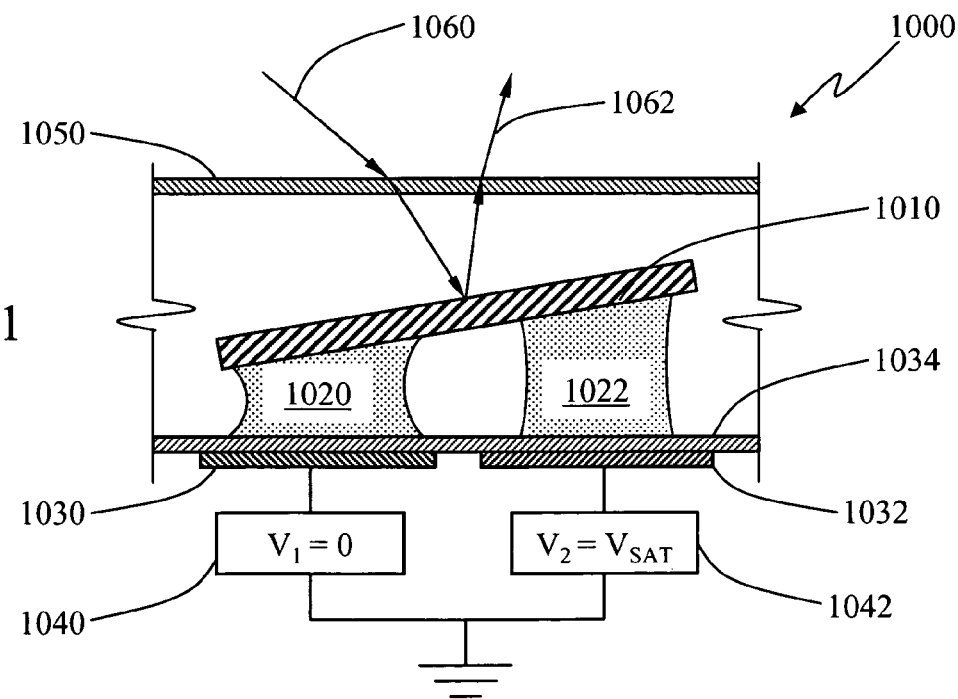
FIG. 11 is a cross-sectional view of an optical switch with a reflective element, in accordance with one embodiment of the present invention.

Illustrated in FIGS. 10-11 are diagrammatic cross-sections of an electrowetting cell 1000 in accordance with some embodiments of the present invention. The cell 1000 includes an actuator surface or substrate 1010 supported by a plurality of fluids, e.g., droplets of fluid, a plurality of electrodes capacitively coupled to the droplets. The shape of the droplets may be differentially deformed by the application of voltage to the electrodes to change the orientation of the actuator surface 1010. In this exemplary embodiment, a first droplet 1020 is in proximity to a first electrode 1030 and a second droplet 1022 is in proximity to a second electrode 1030, each of the droplets being separated from the associated electrode by means of a dielectric layer 1034. Each of the electrodes 1030, 1032 is in turn coupled to a voltage controller 1040, 1042, respectively. When the voltages, $V_1$ and $V_2$, of the plurality of electrodes 1030, 1032 are equal, the actuator surface 1010 is substantially parallel to the dielectric layer 1034. When the voltage, $V_1$ and $V_2$, of the plurality of electrodes 1030, 1032 are different, the actuator surface 1010 is canted with respect to the dielectric layer 1034. As one skilled in the art will appreciate, a voltage applied to an electrode changes the surface tension between the droplets and those surfaces with which they are in contact. As the voltage is increased, the contact angle between a droplet and the actuator surface 1010, dielectric, or both increases, thus resulting in an elongation of a droplet that elevates the corresponding portion of the actuator surface. See FIG. 11.

In some embodiments, the electrowetting cell 1000 is adapted to serve as an optical switch for switching between two or more states, each state corresponding to a unique orientation of the actuator surface 1010. Incident light 1060 from an optical input, for example, may be transmitted through an optical window 1050 and impinge on the surface 1010, preferably a mirror surface. The reflected light 1062 is directed to one of a plurality of optical outputs, for example, depending on the voltages at the electrodes 1030, 1032. Where the voltages of the first electrode 1030 and second electrode 1030 are equal, as in FIG. 10, the reflected light is transmitted at a different angle than where the voltage of the first electrode is less than the voltage of the second electrode 1030, as illustrated in FIG. 11. One skilled in the art will appreciate that the mirror 1010 may be canted clockwise or counter clockwise with respect to the dielectric layer 1034. One skilled in the art will also appreciate that the actuator surface 1010 may be held at a determined angle with respect to the dielectric layer 1034 independent of the orientation of the cell 1000 if the width of the cell 1000 is sufficiently small, i.e., the gravitational forces are small compared to the surface tension between the droplets and adjoining surfaces.

In the preferred embodiment, the droplets 1020, 1022 comprise an electrolyte 1020, 1022 such as a saline solution including water and salt. The mirror surface 1010 may further include a hydrophilic surface (not shown) to enhance the adhesive forces between the mirror and droplets 1020, 1022. The cell 1000 may, but need not necessarily, further include one or more additional fluids in addition to the droplets 1020, 1022 to securely suspend the mirror 1010 in contact with the droplets 1020, 1022, for example.

Figure 12:
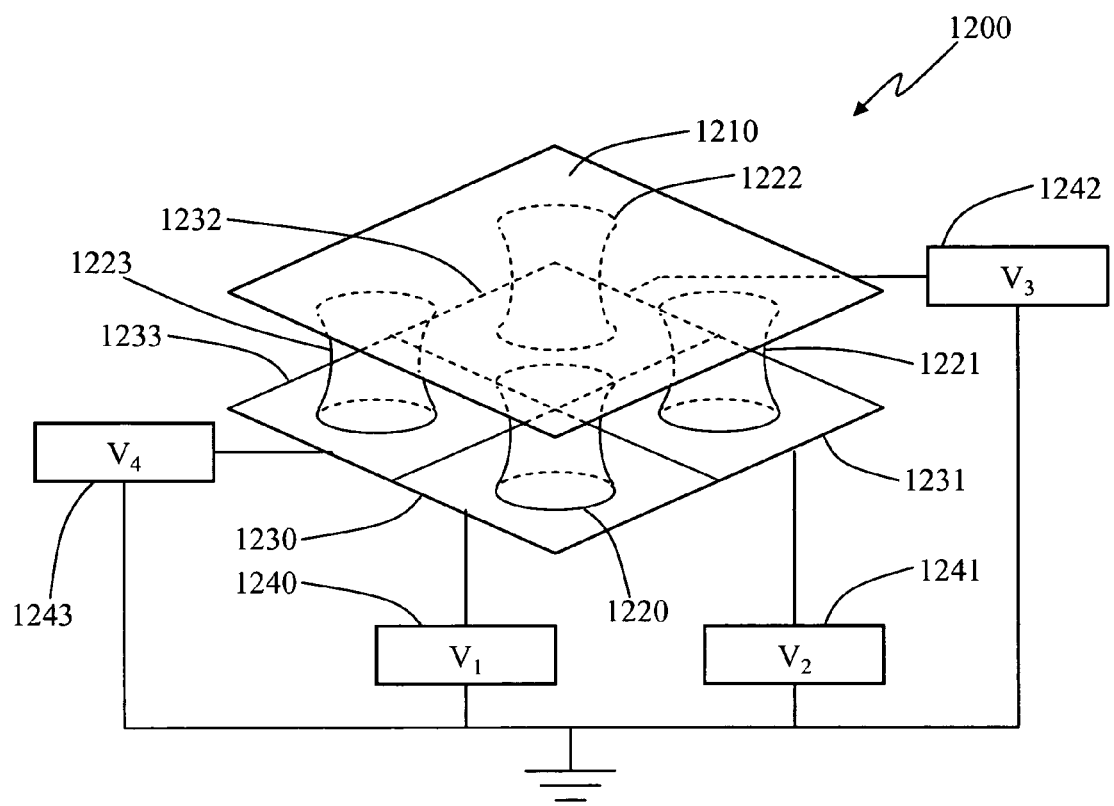
FIG. 12 is an isometric view of an optical switch with two degrees of freedom, in accordance with one embodiment of the present invention.

Illustrated in FIG. 12 is an isometric view of an electrowetting cell 1200 adapted to orient an actuator surface about two orthogonal axes, i.e., with two degrees of freedom. The cell 1200—which is consistent with the electrowetting cell 1200 illustrated in FIGS. 10 and 11—includes a mirror 1210 supported by four droplets 1220-1223, each of the droplets being capacitively coupled to one of the four electrodes 1230-1233, respectively. The cell 1200 includes four voltage controllers 1240-1243, each of which is operatively coupled to one of the electrodes 1230-1233, respectively. The voltage controllers 1240-1243 are adapted to generate a determine voltage to induce a cant in the mirror 1210 with respect to a plane coinciding with the electrodes 1230-1233. In this exemplary embodiment, the mirror 1210 may be canted about two orthogonal axes approximately located above the boundaries separating the four electrodes 1230-1233 arranged in quadrature.

The voltage controllers in some embodiments may employ one or more channels capable of providing up to an approximately one kilovolt potential difference. The applied voltage is approximately 40 volts in the preferred embodiment, although a difference of as low as 6 volts may be employed if the dielectric is sufficiently thin (see the electrowetting equation 1). One or more of the electrodes employed in some embodiments of the present invention may be constructed from printed circuit boards using a spin-based deposition manufacturing process to apply thin and uniform layers of metallization, for example. The set of electrolytic fluids as discussed herein includes non-conductive or weakly conductive fluids mixed with a conductive fluid or made of an ionic solution, for example.

Figure 13A:
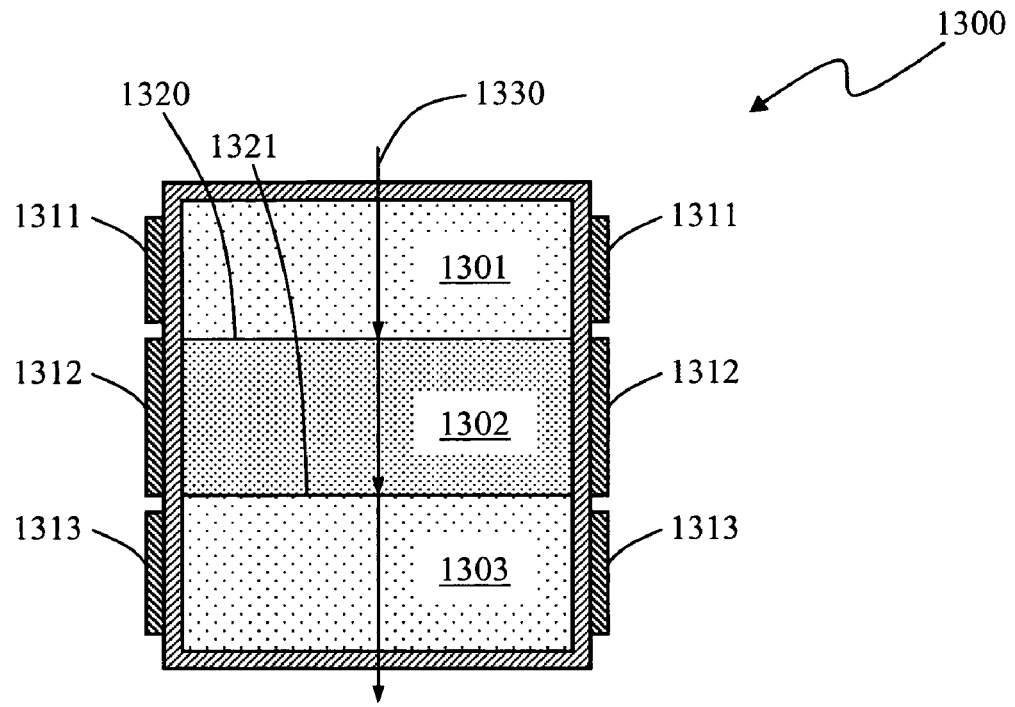
FIG. 13A is a cross-sectional view of an electrowetting cell with a plurality of fluid boundaries, in accordance with another embodiment of the present invention.
Figure 13B:
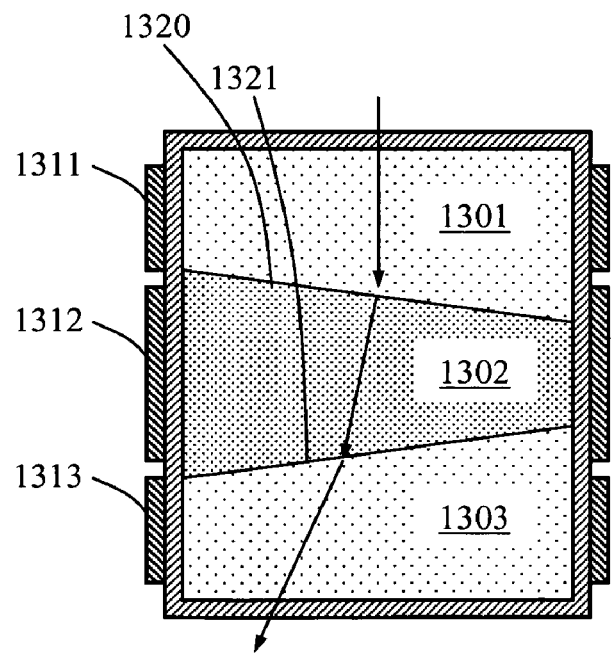
FIG. 13B is a cross-sectional view of an electrowetting cell with a plurality of fluid boundaries, in accordance with one embodiment of the present invention.

In another embodiment illustrated in cross-section in FIGS. 13A-13B, an individual cell may include three or more immiscible fluids. In this exemplary embodiment, the cell 1300 includes a first fluid layer 1301 including oil having a density less than the second fluid layer of electrolyte 1302 and a third fluid layer including oil having a density greater than the second layer 1303. The three immiscible fluids give rise to a first fluid boundary 1320 and a second fluid boundary 1321.

The angle of each of the fluid boundaries may be controlled with separate electrodes in proximity to the respective fluid layers. In this exemplary embodiment, electrolyte 1302 is associated with a pair of electrodes 1312, which are adapted to alter the surface tension and thereby modify the water contact and therefore the orientation of the fluid boundary with respect to the incident light 1330. Each of the fluid boundaries 1320, 1321 may be used to refract the incident light 1330 without mirrors or to reflect the light with one or more mirrors suspended at the fluid boundaries 1320, 1321. As illustrated in FIG. 13B, the point or angle at which the light emanates from the cell 1300 is therefore dependent on the orientation of the combination of the fluid boundaries 1320, 1321.

In a second variation of the embodiment in cross-section in FIGS. 13A-13B, the cell 1300 includes a first layer 1301 including an electrolyte solution having a density less than the second layer of oil 1302 and a third layer including a different electrolyte solution having a density greater than the second layer 1303. The angle of each of the fluid boundaries may be independently controlled with separate electrodes in proximity to the respective electrolyte solutions. For example, the first electrolyte solution 1301 is associated with a pair of electrodes 1311 and the second electrolyte solution 1301 is associated with a pair of electrodes 1313, each of the electrode pairs being adapted to alter the water contact and therefore the orientation of the fluid boundaries 1320, 1321, respectively.

In another embodiment illustrated in FIGS. 14A-14D, the cell is an optical switching cell 1400 including a plurality of optical switching elements, i.e., a bank of optical switches optically coupled in series. Each of the individual elements 1404-1406 of the optical switch 400 is a separate cell including two or more immiscible fluids, e.g., an oil layer 1401 and an electrolyte layer 1402. The fluids of different cells 1404-1406 may be separated by impermeable and transparent window 1420-1421. The orientation of the fluid boundaries between associated oil layers 1401 and electrolyte layers 1402 may be individually controlled via one or more electrodes 1411-1413 in proximity to, but insulated from, the corresponding fluids in the adjacent cells 1404-1406.

As in the previous embodiment, the propagation path of incident light 1430 may be collectively dependent on each of the plurality of fluid boundaries 1420-1421. With the individual switching elements 1405-1406 coupled in series or otherwise stacked, the output of a preceding cell is the input to a succeeding cell. Each switching element may allow the received light to propagate through unperturbed or, alternatively, change the angle of the light passed to an adjacent cell in the downstream direction. As the light cascades through successive switching elements, the path of the light may be successively deflected so as to encode information in the signal or otherwise alter the ultimate egress location or angle of the output light from the bank of switches 1400.

Figure 14A:
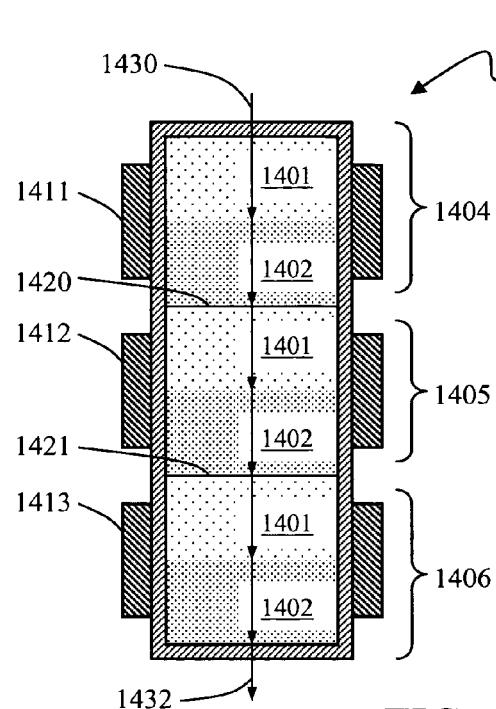
FIG. 14A is a cross-sectional view of a stacked array of electrowetting cells, in accordance with another embodiment of the present invention.
Figure 14B:
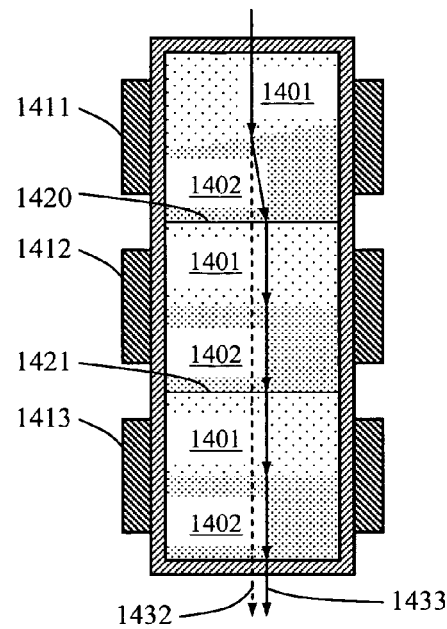
FIG. 14B is a cross-sectional view of a stacked array of electrowetting cells, in accordance with one embodiment of the present invention.
Figure 14C:
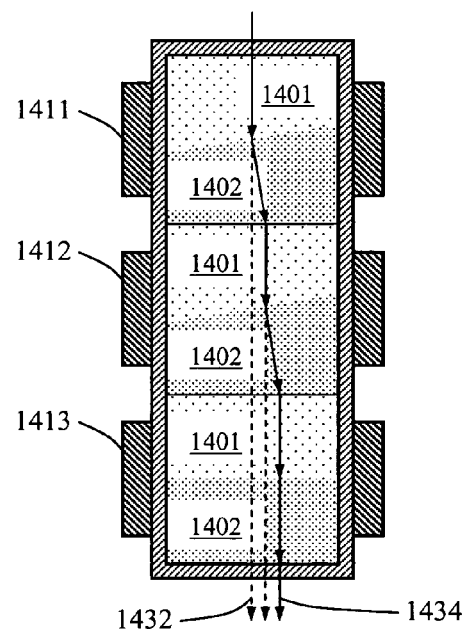
FIG. 14C is a cross-sectional view of a stacked array of electrowetting cells, in accordance with one embodiment of the present invention.
Figure 14D:
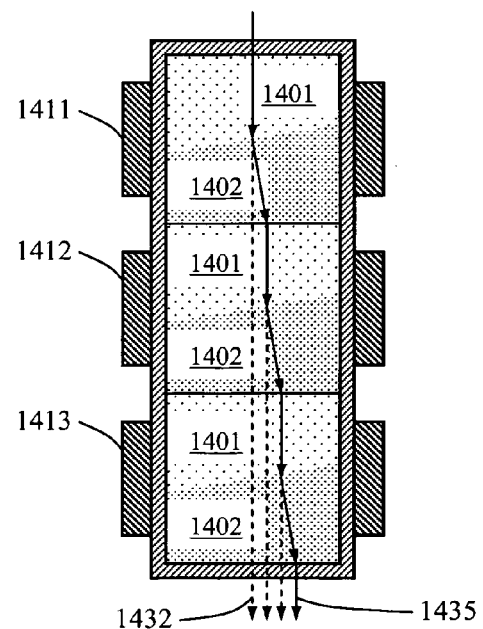
FIG. 14D is a cross-sectional view of a stacked array of electrowetting cells, in accordance with one embodiment of the present invention.

As illustrated in FIG. 14A, the output light signal 1432 from the optical switching cell 1400 may be at a first position and angle when each of the fluid boundaries 1420-1421 is oriented perpendicular to the incident light 1430. As illustrated in FIGS. 14B-14D, an output light signal 1433-1435 may be emitted with one of a plurality of offset positions or angles when the fluid boundaries of one or more cells 1404-1406 is oriented non-perpendicular to the input light from the preceding cell or with respect to the incident light 1430.

Figure 15:
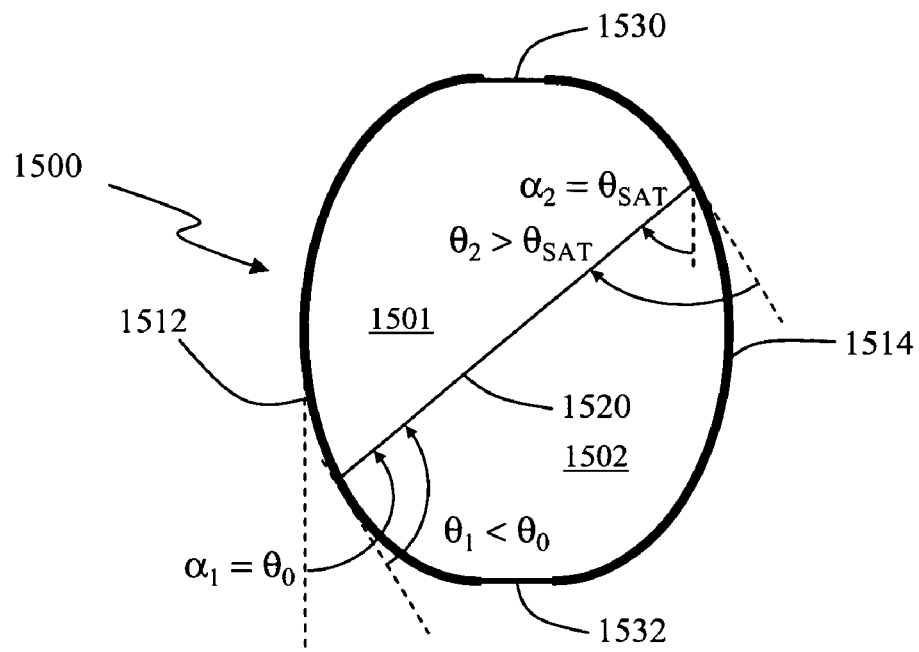
FIG. 15 is a cross-sectional view of an electrowetting cell with non-planar side walls, in accordance with one embodiment of the present invention.

As illustrated in FIG. 15, some embodiments of the present invention have non-planar side walls with conformal electrodes 1512, 1514. As illustrated, the side walls 1512, 1514 curve inwardly at the upper end and/or lower end towards the input window 1530 and output window 1532, which enhances the range of angular displacement of the fluid boundary 1520 for a given maximum water contact angle between the oil 1501 and the electrolyte 1502. That is, the water contact angle at the left side wall 1520 ($\theta_1$) is less than the angle ($\alpha_1$) would need be had the side wall been a planar wall oriented vertically. Thus, the effective angle of the fluid boundary 1520 with respect to the vertical may be less than the unbiased water contact angle ($\theta_0$). Similarly, the water contact angle at the right side wall 1514 ($\theta_2$) is less than the angle ($\alpha_2$) would need be had the side wall been a planar wall oriented vertically. Thus, the effective angle of the fluid boundary 1520 with respect to the vertical may be greater than the saturated water contact angle ($\theta_{SAT}$). The curvature incorporated into the side walls may be simple arcuate surfaces, complex curves, or parabolic curves, for example.

Figure 16:
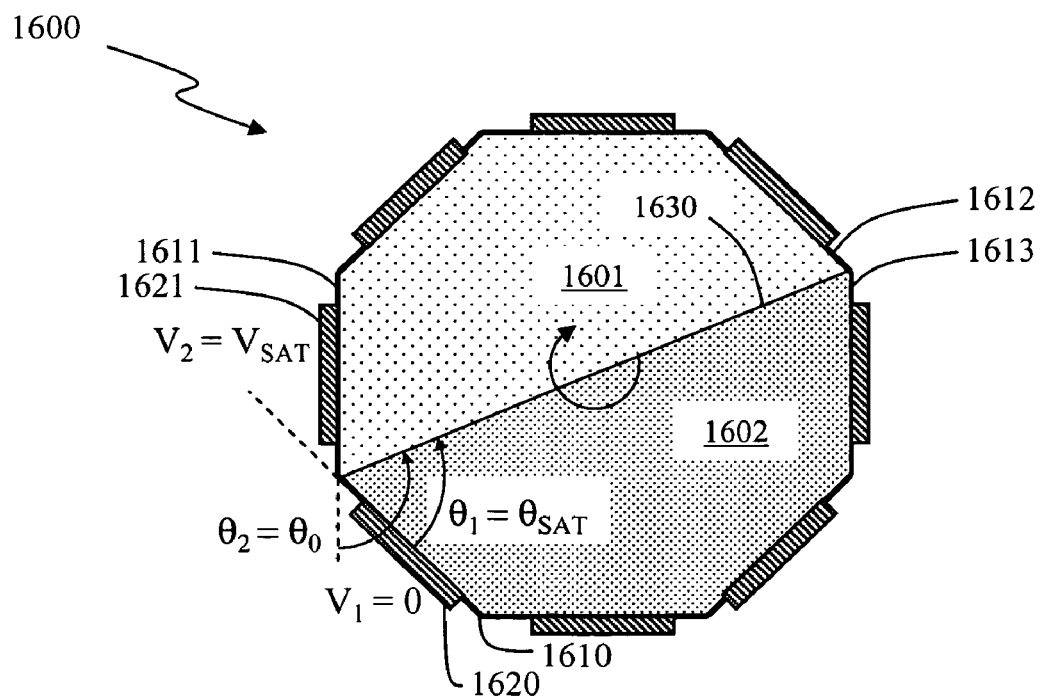
FIG. 16 is a cross-sectional view of an electrowetting cell enabling full rotation of the boundary between the fluids therein, in accordance with another embodiment of the present invention.

Illustrated in FIG. 16 is a cross section of the cylindrical or spherical cell 1600 containing a plurality of facets or planar wall portions forming a fluid reservoir therein. The angle between the facets are preferably adapted to facilitate the transition of a fluid boundary 1600—between oil 1601 and electrolyte 1602, for example—from one facet to an adjacent facet with the appropriate application of voltage to the associated electrodes embedded in the walls. In some embodiments, the fluid boundary may be rotated 360 degrees about the longitudinal axis of the cylinder 1600 (perpendicular to the sheet).

Assuming the left-most edge of the fluid boundary 1630 is transitioning from a first wall 1610 to a second wall 1611, thereby rotating the fluid boundary in a clock-wise or counter clock-wise direction. For example, the voltages at the first electrode 1620 and second electrode 1621 may be controlled to effectively hand-off the fluid boundary 1630 between the walls. In this example, the voltage of the first electrode 1620 is reduced toward zero and the voltage at the second electrode 1621 is raised toward the saturation voltage. Assuming the fluid boundary 1630 can simultaneously satisfy the Lippmann-Young's equation with respect to the first and second walls 1620, 1621 at the point of intersection of the adjacent facets, the fluid boundary is driven in a clock-wise manner. A similar procedure may be implemented at the right-most side of the fluid boundary at a third wall 1612 and fourth wall 1613 to rotate the oil 1601 and electrolyte 1602. The fluid boundary 1630 may then be rotated over 360 degrees by repeating this process at each of facet intersections. The cell 1600 may therefore be used as an engine and may further include an actuator surface (not shown) at the fluid boundary capture the rotational force generated in the cell and convey it to a generator, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An electrowetting-based actuator comprising:
    a suspension medium comprising a plurality of immiscible fluids; the fluids comprising an electrolyte and a second fluid;
    a reflective sheet suspended by the electrolyte and the second fluid at a boundary between the electrolyte and the second fluid; and
    at least one electrode capacitively coupled to the suspension medium;

wherein application of a determined voltage to one or more of the at least one electrode displaces the electrolyte to induce a displacement of the reflective sheet.

2. The actuator of claim 1, wherein the electrolyte comprises a saline solution.

3. The actuator of claim 2, wherein the saline solution comprises sodium.

4. The actuator of claim 1, wherein the second fluid comprises an insulator.

5. The actuator of claim 1, wherein the second fluid comprises hydrocarbon.

6. The actuator of claim 1, wherein the hydrocarbon comprises one or more alkanes.

7. The actuator of claim 1, wherein the surface is a reflector.

8. The actuator of claim 1, wherein the reflective sheet is a mirror.

9. The actuator of claim 8, wherein the mirror comprises aluminized Mylar.

10. The actuator of claim 1, wherein the reflective sheet comprises a substantially planar sheet having a first side and a second side, wherein the first side is hydroscopic and the second side is hydrophobic.

11. The actuator of claim 10, wherein the first side comprises a layer of acetate.

12. The actuator of claim 10, wherein the second side comprises a layer of tetrafluoro ethylene (TFE).

13. The actuator of claim 1, wherein the actuator further comprises a dielectric in proximity to one or more of the at least one electrode.

* * * * *